United States Patent
Yu et al.

(10) Patent No.: US 8,746,988 B2
(45) Date of Patent: Jun. 10, 2014

(54) CABLE WITH A CONNECTOR USED FOR TRANSMISSION OF AN ELECTRICAL SIGNAL, AN OPTICAL SIGNAL, AND THE LIKE

(75) Inventors: Juhyun Yu, Mito (JP); Hitoshi Horita, Hitachi (JP); Kouki Hirano, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 429 days.

(21) Appl. No.: 13/275,455

(22) Filed: Oct. 18, 2011

(65) Prior Publication Data
US 2012/0243834 A1    Sep. 27, 2012

(30) Foreign Application Priority Data
Mar. 23, 2011 (JP) .................. 2011-063919

(51) Int. Cl.
*G02B 6/44* (2006.01)
*G02B 6/38* (2006.01)
*H01R 13/42* (2006.01)

(52) U.S. Cl.
CPC ............ *G02B 6/3887* (2013.01); *G02B 6/3889* (2013.01); *H01R 13/42* (2013.01)
USPC .............. 385/86; 385/92; 174/70 R

(58) Field of Classification Search
CPC ..... G02B 6/3887; G02B 6/3889; H01R 13/42
USPC .................. 385/86, 92; 174/70 R
See application file for complete search history.

(56) References Cited

U.S. PATENT DOCUMENTS

2005/0100303 A1*  5/2005  Cox ........................... 385/136

FOREIGN PATENT DOCUMENTS

JP    2010-237640 A    10/2010

\* cited by examiner

*Primary Examiner* — Jerry Rahll
(74) *Attorney, Agent, or Firm* — Holtz Holtz Goodman & Chick PC

(57) ABSTRACT

Provided is a cable with a connector (1) having a form in which a connector is fitted to a cable (6). A housing (2) of the connector is constituted by two case members (2a, 2b). A root portion of the cable (6) is covered with a boot (8) made of a resin, and a flange (8a) is formed in the boot (8). Inside the boot (8), a stop ring (10) made of a metal is arranged. The stop ring (10) allows a transmission line (6a) to be inserted through a main body thereof having a cylinder shape, and a jacket (6b) is covered on its outer side. A flange (10a) is also formed in the stop ring (10), and the flange (10a) and the flange (8a) are inserted into grooves (2c, 2d) in an overlapped state.

9 Claims, 16 Drawing Sheets

CABLE WITH A CONNECTOR USED FOR TRANSMISSION OF AN ELECTRICAL SIGNAL, AN OPTICAL SIGNAL, AND THE LIKE

BACKGROUND OF THE INVENTION

1. Field of the Invention

The present invention relates to a cable with a connector, and more particularly, to a cable with a connector, which has a form in which a connector is fitted to a terminal portion of a cable.

2. Description of the Related Art

A cable with a connector refers to a form in which connectors each conforming to, for example, the high definition multimedia interface (HDMI) standard or the universal serial bus (USB) standard are fitted to both ends of an optical/electrical composite cable which houses an electrical wire (metal cable) and an optical fiber. A terminal portion of the optical/electrical composite cable is fixed to a housing of the connector, and the electrical wire and the optical fiber in the optical/electrical composite cable are connected to a photoelectric conversion module housed in the housing.

When the cable with a connector is handled, it is assumed that a tensile force is applied between the connector and the optical/electrical composite cable. Therefore, it is required that a portion connecting the housing of the connector and the terminal portion of the optical/electrical composite cable is firmly fixed with a sufficient tensile strength without a backlash.

Further, generally, the portion connecting the connector and the optical/electrical composite cable is provided with a boot for protecting the optical fiber from bending. In the cable with a connector, there is also assumed a case where the boot portion is pulled while being grasped by a user. Therefore, it is desired that also the boot is fixed to the housing of the connector with a sufficient strength.

SUMMARY OF THE INVENTION

The present invention disclosed and claimed herein, in one aspect thereof, comprises a cable with a connector. The cable with a connector comprises: a cable, which includes a transmission line covered with a jacket; a connector, which is fitted to a terminal portion of the cable; a holding member made of a metal, which includes: a main body formed into a cylinder shape, through which the transmission line drawn out from the jacket at the terminal portion of the cable is inserted on an inner side of the main body, the main body holding the transmission line under a state in which an outer surface of the main body is covered with the jacket; and a first flange, which is formed at one end of the main body located on a terminal side of the cable; an exterior member made of a resin, which covers an outer periphery of the terminal portion of the cable together with the holding member, and includes a second flange which is formed at one end of the exterior member located on the terminal side of the cable, the second flange being overlapped with the first flange; and two case members, which are combined so that the transmission line drawn out from the jacket at the terminal portion of the cable is housed inside thereof, the two case members in the combined state holding the first flange and the second flange so that the first flange and the second flange are brought into press-contact to each other in an overlapping direction.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings.

DETAILED DESCRIPTION OF THE PREFERRED EMBODIMENTS

[First Embodiment]

Figure 1:
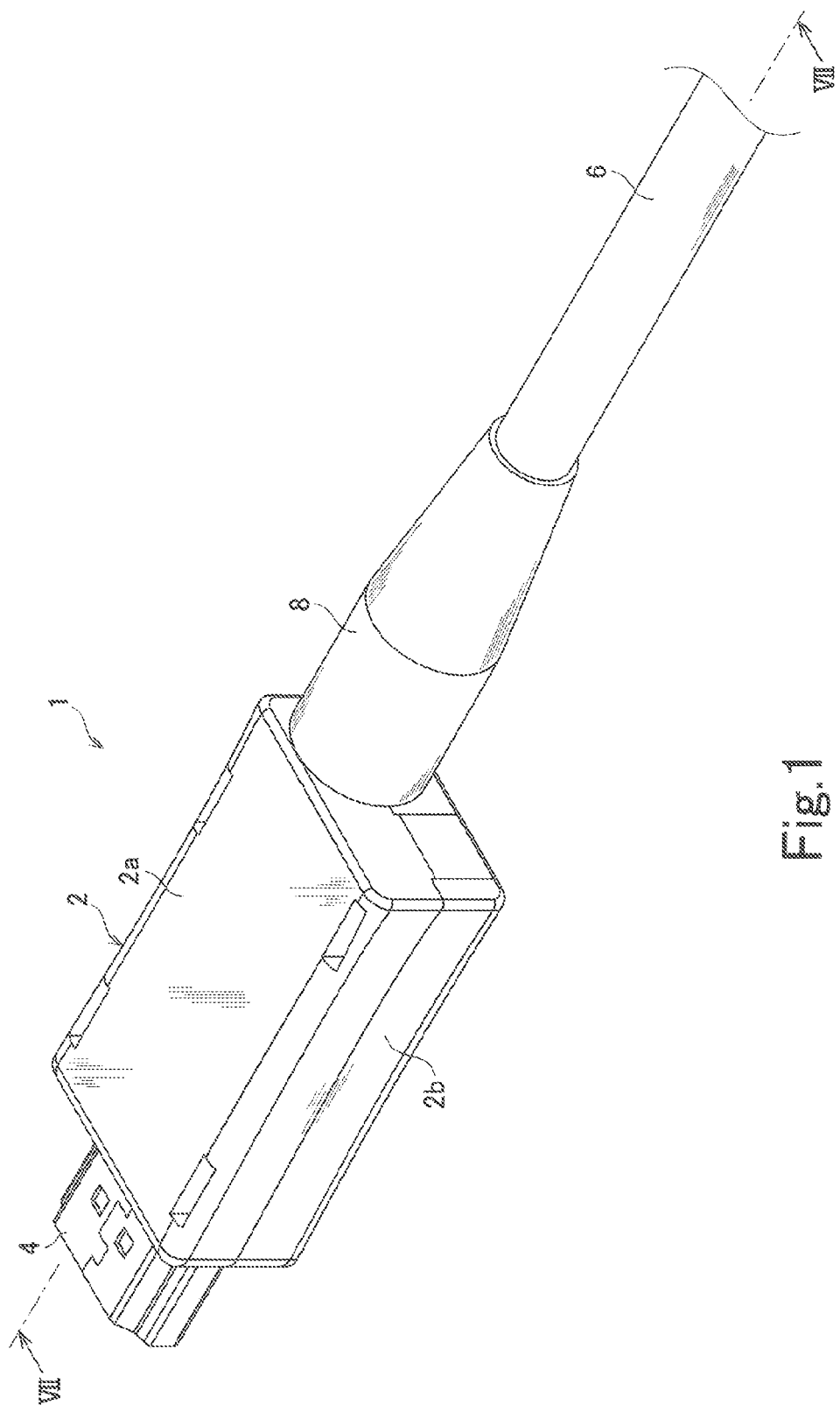
FIG. 1 is a perspective view schematically illustrating a structure of a cable with a connector according to a first embodiment of the present invention.

FIG. 1 is a perspective view schematically illustrating a structure of a cable with a connector 1 according to a first embodiment of the present invention. This cable with a connector 1 has a form in which a connector is fitted to a terminal portion of an optical/electrical composite cable. The connector conforms to, for example, the HDMI standard or the USB standard. The optical/electrical composite cable is adapted to transmit an optical signal and an electrical signal in a composite manner. Here, as an example, a cable with a connector which conforms to the HDMI standard is used and a structure thereof is described.

As described above, the cable with a connector 1 has a form in which the connector (no reference symbol) is fitted to a terminal portion of an optical/electrical composite cable (hereinafter, simply referred to as "cable") 6. The connector includes a housing 2 and a plug 4 (connection terminal). Into the housing 2, the terminal portion of the cable 6 is drawn. The plug 4 is, for example, inserted into a receptacle provided to an external device such as a digital audio/visual (AV) device or a personal computer (PC), which conforms to the above-mentioned HDMI standard. Further, although not shown here, a similar connector is fitted also to the other terminal portion of the cable 6.

The housing 2 of the connector is constituted by combining two divided case members 2a and 2b into one member. The two case members 2a and 2b are each made of, for example, a resin material or a metal material. Those case members 2a and 2b are assembled into a box shape in a manner that opening surfaces thereof are facing each other. Further, a photoelectric conversion module (not shown in FIG. 1) is arranged inside the housing 2, and this photoelectric conversion module converts the electrical signal into the optical signal, or reversely thereto, converts the optical signal into the electrical signal. The cable 6 and the plug 4 are each connected to the photoelectric conversion module inside the housing 2.

The cable 6 has a structure in which, under a state in which an optical fiber and an electrical wire (both not shown) are bundled, those fiber and wire are covered with a jacket. In the cable 6, for example, a tensile strength fiber as a tensile strength member is inserted in a longitudinal direction. Inside the housing 2, the optical fiber and the electrical wire are each connected to the photoelectric conversion module under a state in which the fiber and wire are each drawn out from the jacket (sheath) of the cable 6.

Further, a boot 8 made of a resin is fitted to a root portion of the cable 6 exposed from the housing 2. The boot 8 is formed so that the boot 8 extends in a cylinder shape from one end surface (rear end surface) of the housing 2 to some extent along the longitudinal direction of the cable 6, and then, a portion therefrom to a terminal end is tapered. Although not shown here, the tapered portion of the boot 8 may be subjected to corrugation (accordion, gather, or the like) process.

Although not shown in FIG. 1, inside the body potion of the boot 8 in the cylinder shape, a stop ring made of, for example, a metal is arranged. In the cable with a connector 1, the cable 6 is fixed to the housing 2 of the connector through intermediation of the stop ring. Hereinafter, the structures of the boot 8 and the stop ring are described with reference to FIGS. 2 and 3.

Figure 2:
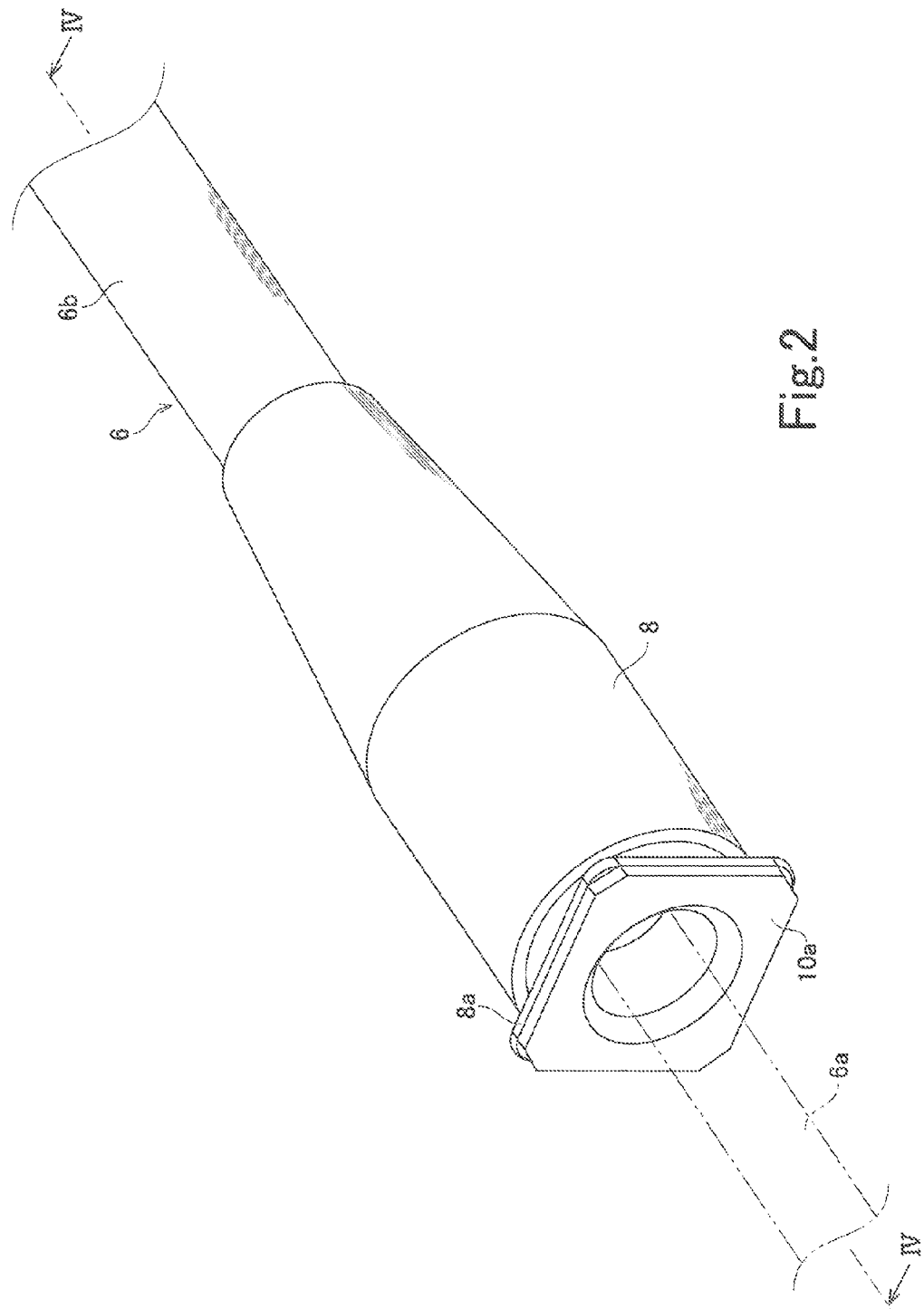
FIG. 2 is a perspective view schematically illustrating shapes of a boot and a stop ring fitted to a cable.

FIG. 2 is a perspective view schematically illustrating shapes of the boot 8 and a stop ring 10 fitted to the cable 6. Further, FIG. 3 is a perspective view illustrating the shape of the stop ring 10.

In the boot 8, at an opening peripheral edge continuous with the periphery surface of the above-mentioned body portion, that is, at one end located on the terminal side of the cable 6, a flange 8a is formed. Further, also in the stop ring 10, at an opening peripheral edge continuous with the periphery surface of the main body thereof having a cylinder shape, that is, at one end located on the terminal side of the cable 6, a flange 10a is formed. The flange 8a and the flange 10a are both formed into flange shapes, and the flange 10a of the stop ring 10 is arranged so as to overlap with a front end surface of the flange 8a of the boot 8. Note that, the substantially entire portion of the main body of the stop ring 10, which is continuous with the flange 10a, is covered with the boot 8.

Figure 3:
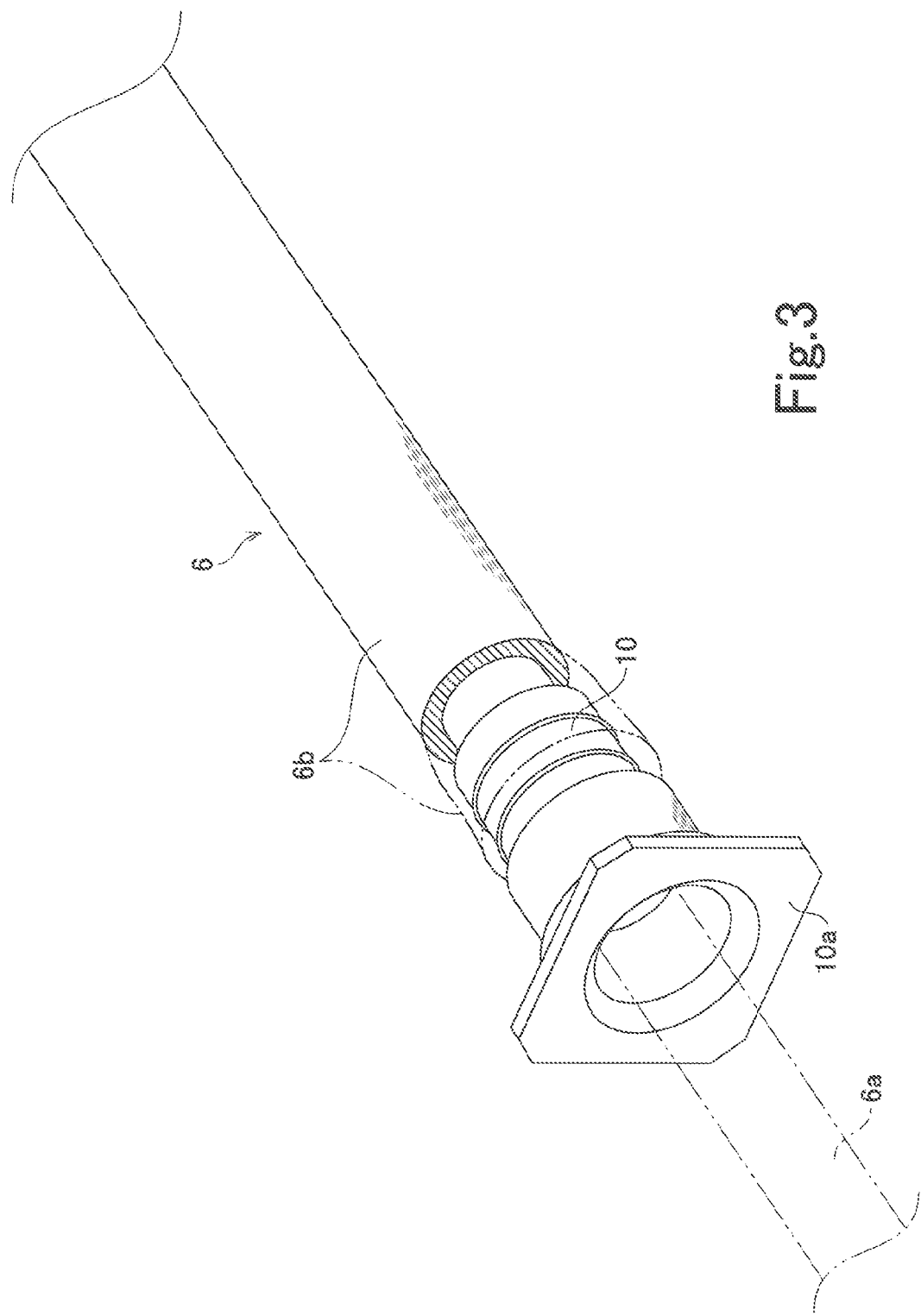
FIG. 3 is a perspective view illustrating the shape of the stop ring.

As indicated by the two-dot chain line in FIG. 3, inside the stop ring 10, a transmission line 6a is inserted to pass through the stop ring 10, the transmission line 6a being drawn out from a jacket 6b at the terminal portion of the cable 6. On the outer side, the stop ring 10 is covered with the jacket 6b. Note that, the transmission line 6a refers to the optical fiber and the electrical wire, and schematically indicates those fiber and wire (similarly hereinafter). Further, inside the cable 6, the tensile strength fiber is arranged along the transmission line 6a. Although not shown here, the stop ring 10 is further tightened by a crimp ring under a state in which the main body of the stop ring 10 is covered with the tensile strength fiber and the jacket 6b on its outer side. With this, the tensile strength fiber and the jacket 6b are surely fixed to the stop ring 10, and thus it is possible to ensure the tensile strength of the cable 6.

The above-mentioned flanges 8a and 10a are inserted into grooves (not shown here) provided in the case members 2a and 2b of the housing 2 under a state in which the flanges 8a and 10a are overlapped with each other.

Figure 4:
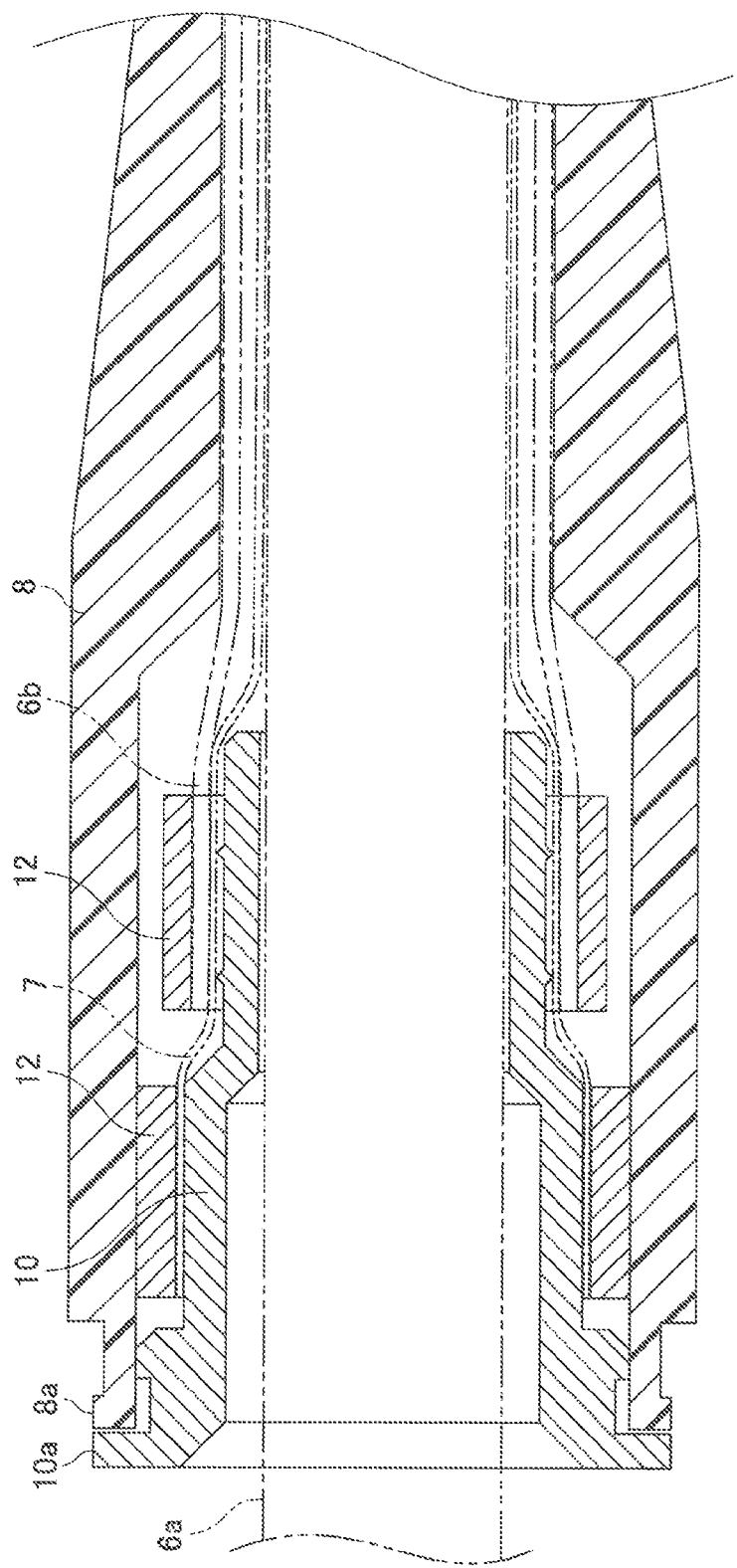
FIG. 4 is a cross-sectional view illustrating the cable, the boot, and the stop ring, taken along the line IV-IV of FIG. 2.

FIG. 4 is a cross-sectional view illustrating the cable 6, the boot 8, and the stop ring 10, taken along the line IV-IV of FIG. 2. As described above, in the cable 6, the transmission line 6a which is drawn out at the terminal portion of the cable 6 is inserted through the stop ring 10, and under this state, the transmission line 6a is drawn into the inside of the housing 2. Further, between the boot 8 and the stop ring 10, a crimp ring 12 described above is arranged. Here, the crimp ring 12 is illustrated in a state before the tightening process, but the crimp ring 12 is subjected to the tightening process from the periphery with respect to the stop ring 10 to be plastic-deformed, and thus a tensile strength fiber 7 and the jacket 6b are firmly pressed against the stop ring 10.

Figure 5:
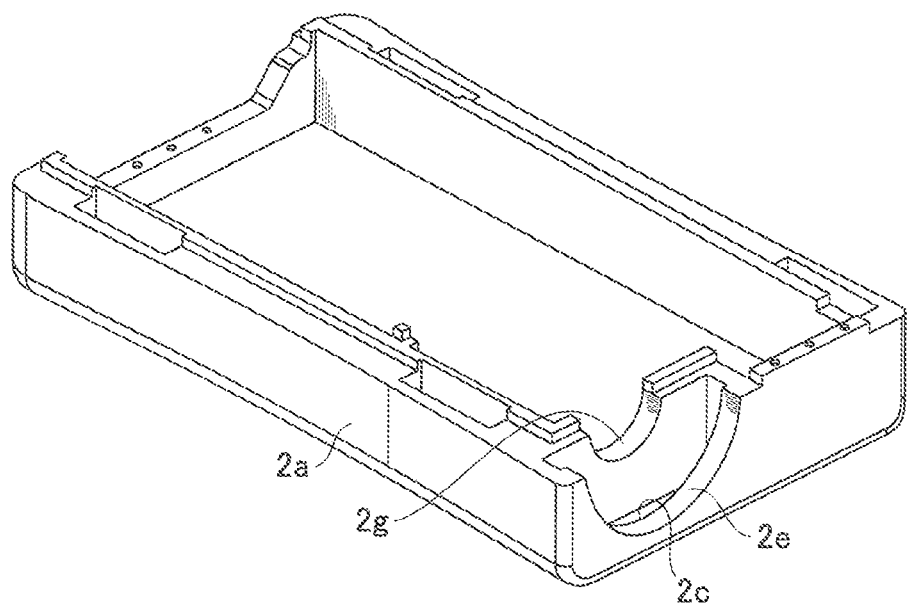
FIG. 5 is a perspective view schematically illustrating an outer appearance of one case member.
Figure 6:
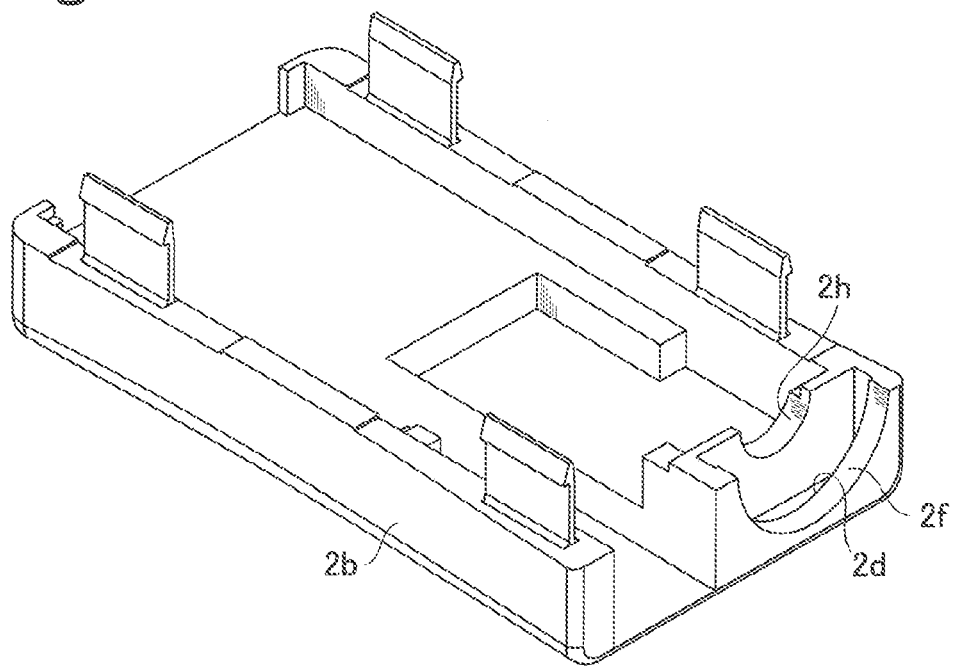
FIG. 6 is a perspective view schematically illustrating an outer appearance of the other case member.

FIG. 5 is a perspective view schematically illustrating an outer appearance of one case member 2a. Further, FIG. 6 is a perspective view schematically illustrating an outer appearance of the other case member 2b. Note that, FIG. 5 illustrates the case member 2a in a state in which the case member 2a is inverted upside down from the state of FIG. 1.

In a side wall located at one end of the case member 2a illustrated in FIG. 5, a groove 2c is formed, which is recessed in a thickness direction. Further, in the side wall of the case member 2a, when viewed from a longitudinal direction of the cable 6, semicircular openings 2e and 2g are formed on both sides of the groove 2c.

Meanwhile, similarly to the case member 2a, in a side wall located at one end of the case member 2b illustrated in FIG. 6, a groove 2d having a recessed shape is formed. Further, in the side wall of the case member 2b, when viewed from the longitudinal direction of the cable 6, semicircular openings 2f and 2h are formed on both sides of the groove 2d.

Inside the grooves 2c and 2d, under a state in which the case members 2a and 2b are combined, the two flanges 8a and 10a are inserted under a state in which the two flanges are overlapped with each other. Further, when the case members 2a and 2b are assembled, those grooves 2c and 2d and the openings 2e, 2f, 2g, and 2h are arranged in a state of being opposed to one another, and under this state, the openings 2e and 2g and the openings 2f and 2h form circular openings.

Figure 7:
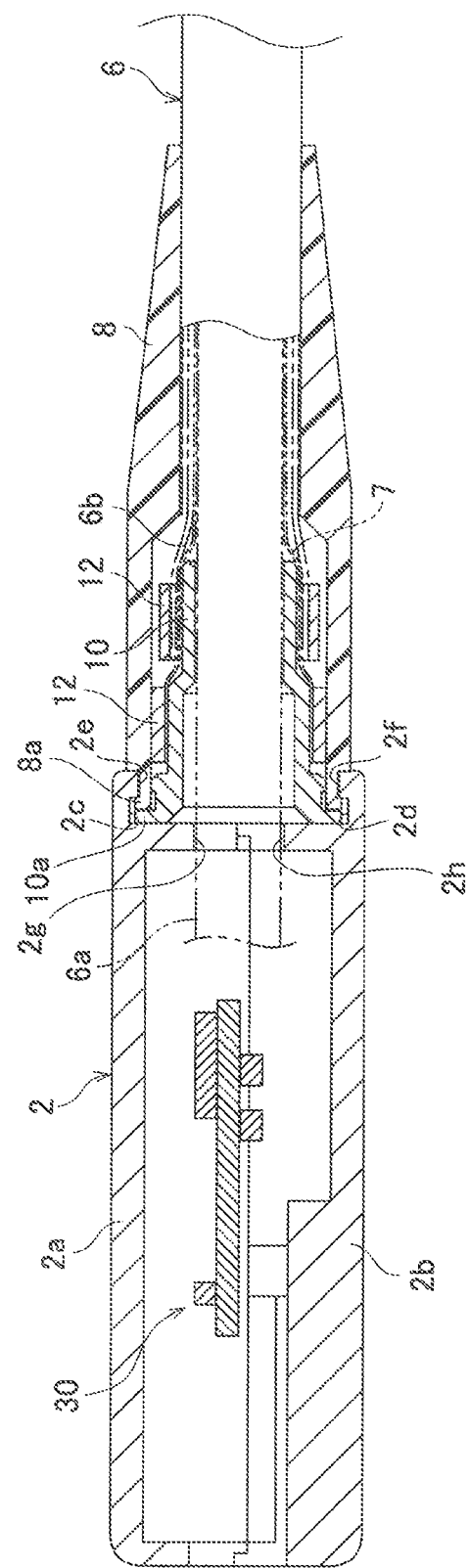
FIG. 7 is a vertical cross-sectional view of the cable with a connector, taken along the line VII-VII of FIG. 1.

FIG. 7 is a vertical cross-sectional view of the cable with a connector 1, taken along the line VII-VII of FIG. 1. Further, FIG. 8 is a cross-sectional view illustrating, in an enlarged manner, a fitting portion of the flange 8a of the boot 8 and the flange 10a of the stop ring 10, in the cross section illustrated in FIG. 7.

Under the state in which the case members 2a and 2b are combined, the openings 2e and 2f face the one side end of the housing 2. Through the opening formed by those openings 2e and 2f, the terminal portion of the cable 6 including the boot 8 and the stop ring 10 is inserted. Further, the openings 2g and 2h are located on the inner side of the housing 2, and through the opening formed by those openings 2g and 2h, the transmission line 6a is inserted.

A photoelectric conversion module 30 described above is arranged inside the housing 2, and the optical fiber and the electrical wire are each connected to the photoelectric conversion module 30. The photoelectric conversion module 30 has a structure in which, for example, an optical waveguide, a photoelectric conversion element, a flexible printed circuit (FPC) board, a FPC connector, and the like are mounted on a circuit substrate as a base (reference symbols of all the components are omitted).

Figure 8:
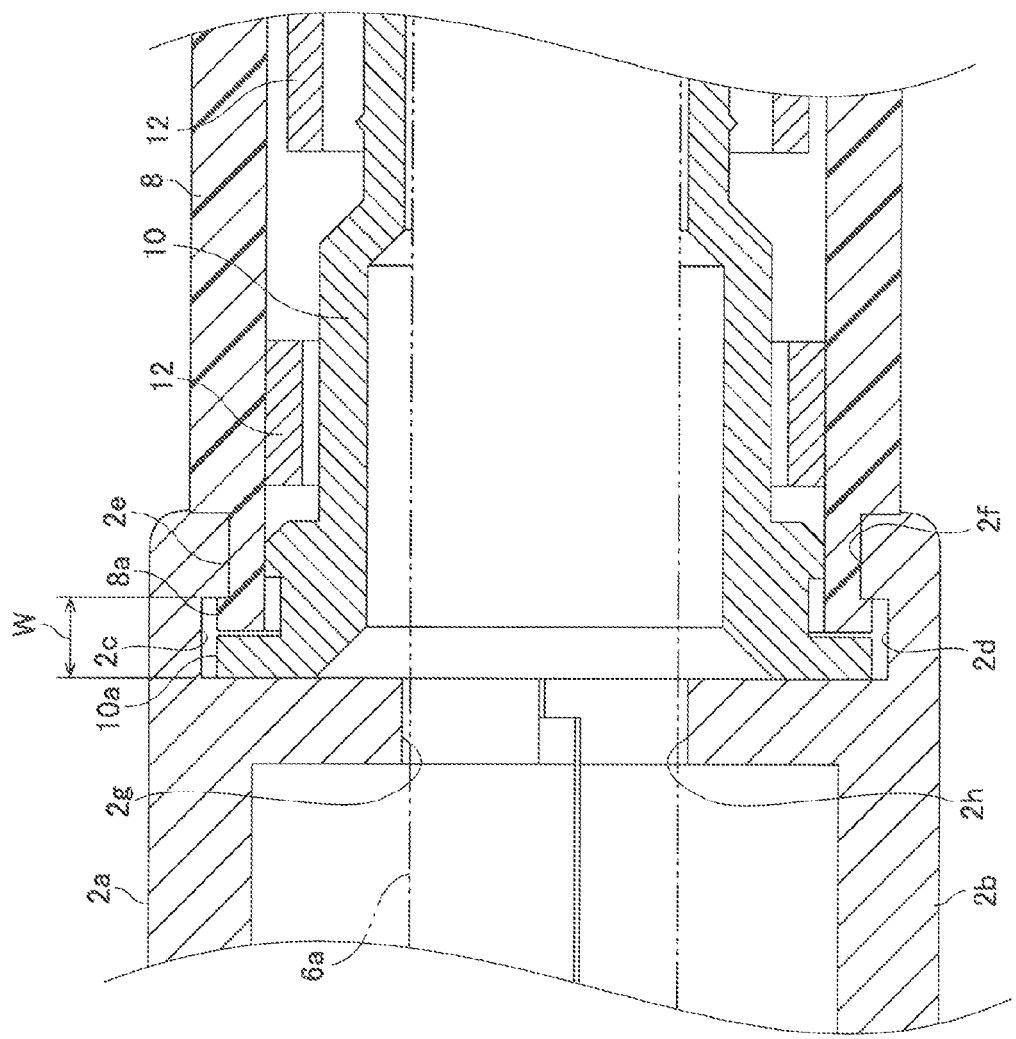
FIG. 8 is a cross-sectional view illustrating, in an enlarged manner, a fitting portion of a flange of the boot and a flange of the stop ring.

Further, in FIGS. 7 and 8, the two flanges 8a and 10a are illustrated in a state of being separated from each other. However, in the actual fitting state, the two flanges 8a and 10a are sandwiched between a pair of wall surfaces in the grooves 2c and 2d, and under this state, the two flanges 8a and 10a are brought into press-contact with each other in the overlapping direction.

In the first embodiment, the width dimension of the grooves 2c and 2d (reference symbol W in FIG. 8) is preferred to be equal to the thickness dimension of the flanges 8a and 10a in the overlapped state, or slightly smaller than the thickness dimension (for example, smaller by about 0.1 mm) By setting the width dimension W of the grooves 2c and 2d to be equal to or smaller than the thickness dimension of the flanges 8a and 10a, for example, when the flanges 8a and 10a are inserted into the groove 2d in a first step of the assembly process, the flange 8a made of a resin is inserted to reach the vicinity of the bottom surface of the groove 2d while being slightly deformed by a pressure applied when the flange 8a is brought into contact with the side surface of the groove 2d. Meanwhile, the flange 10a made of a metal is inserted to reach the vicinity of the bottom surface of the groove 2d without scraping the side surface thereof because the flange 8a is deformed. Further, when the case member 2a is combined in a last step of the assembly process, similarly to the above, the flange 8a is inserted into the groove 2c while being deformed.

As described above, by housing the flange 8a made of a resin and the flange 10a made of a metal in the grooves 2c and 2d in an overlapped manner, the tensile strength of the cable 6 against the housing 2 can be sufficiently ensured.

Further, the flange 8a and the flange 10a are housed in the grooves 2c and 2d without a gap. Therefore, the connector can be fixed to the housing 2 without a backlash of the terminal portion (in particular, the stop ring 10) of the cable 6. Further, in the first embodiment, the flange 10a of the stop ring 10 is inserted inside the grooves 2c and 2d together with the flange 8a of the boot 8 without a gap. With this, the boot 8 itself is also fixed to the housing 2 of the connector, and hence the holding strength of the boot 8 with respect to the housing 2 of the connector is sufficiently ensured.

[Second Embodiment]

Figure 9:
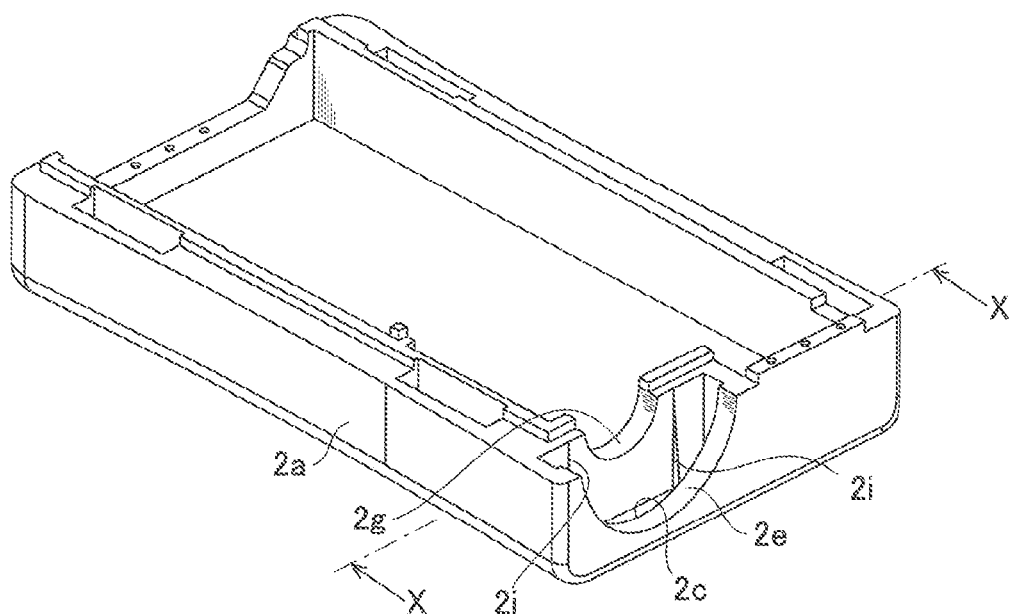
FIG. 9 is a perspective view schematically illustrating an outer appearance of one case member according to a second embodiment of the present invention.

Next, a cable with a connector 1 according to a second embodiment of the present invention is described. FIG. 9 is a perspective view schematically illustrating an outer appearance of one case member 2a according to the second embodiment. Note that, FIG. 9 illustrates the case member 2a in a state in which, similarly to the case member 2a of FIG. 5, the case member 2a is inverted upside down from the state of FIG. 1.

In the second embodiment, of the side walls of the groove 2c provided in the case member 2a, on a wall surface in which the opening 2g is formed, projection portions 2i are provided. The projection portions 2i are arranged on both sides of the opening 2g.

Figure 10:
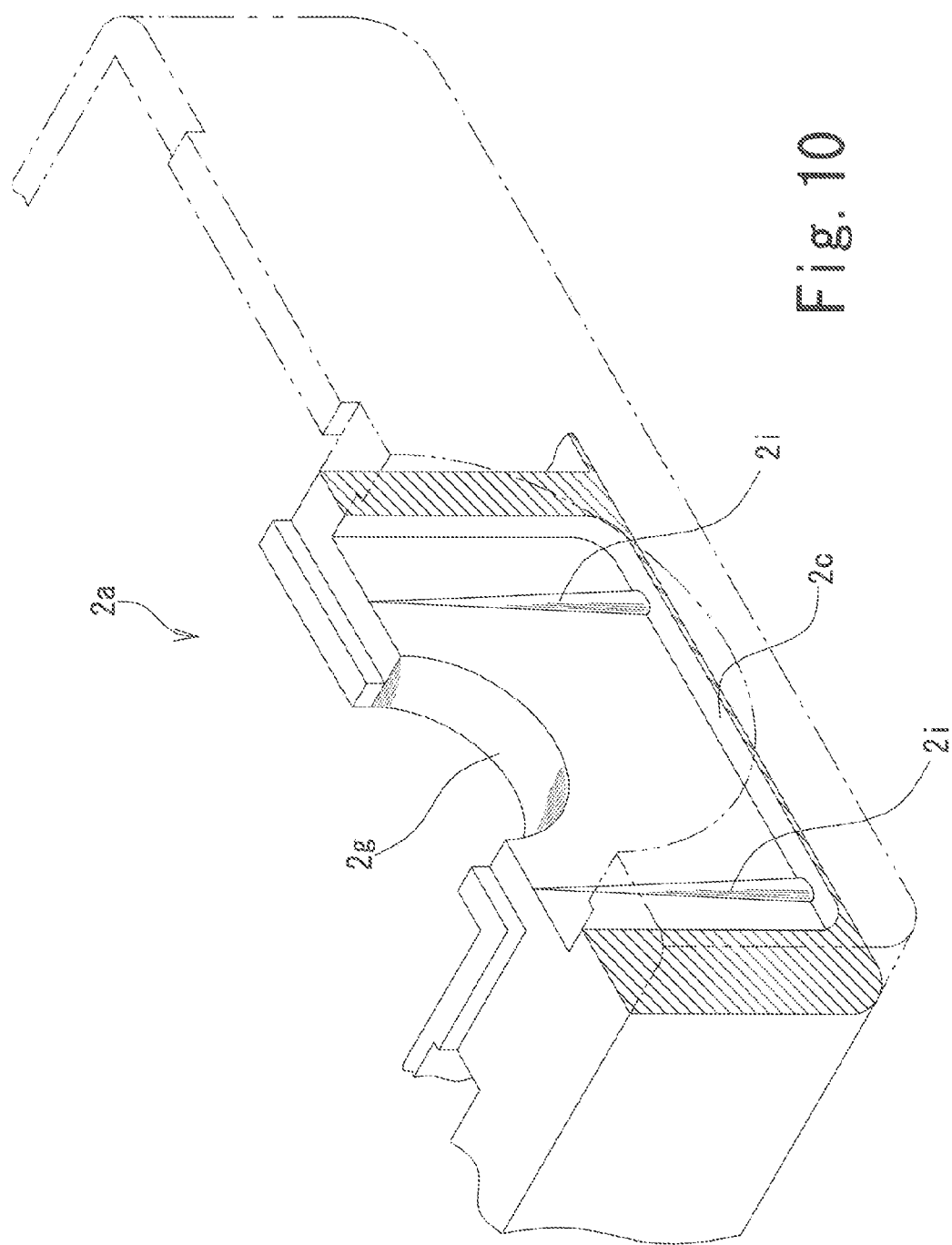
FIG. 10 is a perspective view illustrating, in an enlarged manner, projection portions of the case member illustrated in FIG. 9 and a periphery thereof.

FIG. 10 is a perspective view illustrating, in an enlarged manner, the projection portions 2i of the case member 2a illustrated in FIG. 9 and a periphery thereof. Note that, FIG. 10 emphatically illustrates the shapes of the projection portions 2i under a state in which the groove 2c is cut in the width direction of the case member 2a along the line X-X of FIG. 9.

In the groove 2c of the case member 2a, as described above, on one side surface in which the opening 2g is formed, the projection portions 2i are provided on both the sides of the opening 2g. Each of the projection portions 2i includes an inclination (up-grade) which rises in an insertion direction of the flanges 8a and 10a. Therefore, the projection portion 2i has substantiality a cone shape, which widens toward the bottom surface of the groove 2c. Note that, it is preferred that the maximum height (protruding dimension) of the inclined portion of the projection portion 2i with respect to the wall surface of the groove 2c be, for example, about 0.1 mm.

Figure 11:
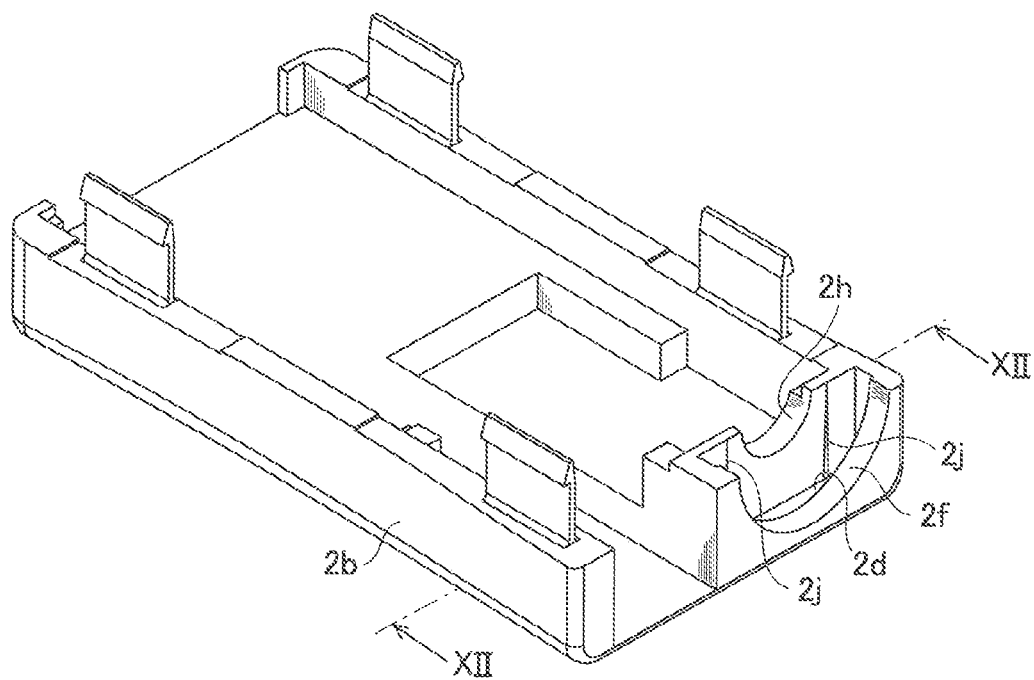
FIG. 11 is a perspective view schematically illustrating an outer appearance of the other case member according to the second embodiment.

FIG. 11 is a perspective view schematically illustrating an outer appearance of the other case member 2b according to the second embodiment.

Also in the groove 2d of the case member 2b, similarly to the case member 2a, on a wall surface in which the opening 2h is formed, projection portions 2j are provided. The projection portions 2j are provided on both sides of the opening 2h.

Further, in both the case member 2a illustrated in FIG. 9 and the case member 2b illustrated in FIG. 11, the surfaces opposed in a combining direction are opened. When the case members 2a and 2b are combined into one member while facing the openings to each other, the case members 2a and 2b are formed into a hollow box shape.

Figure 12:
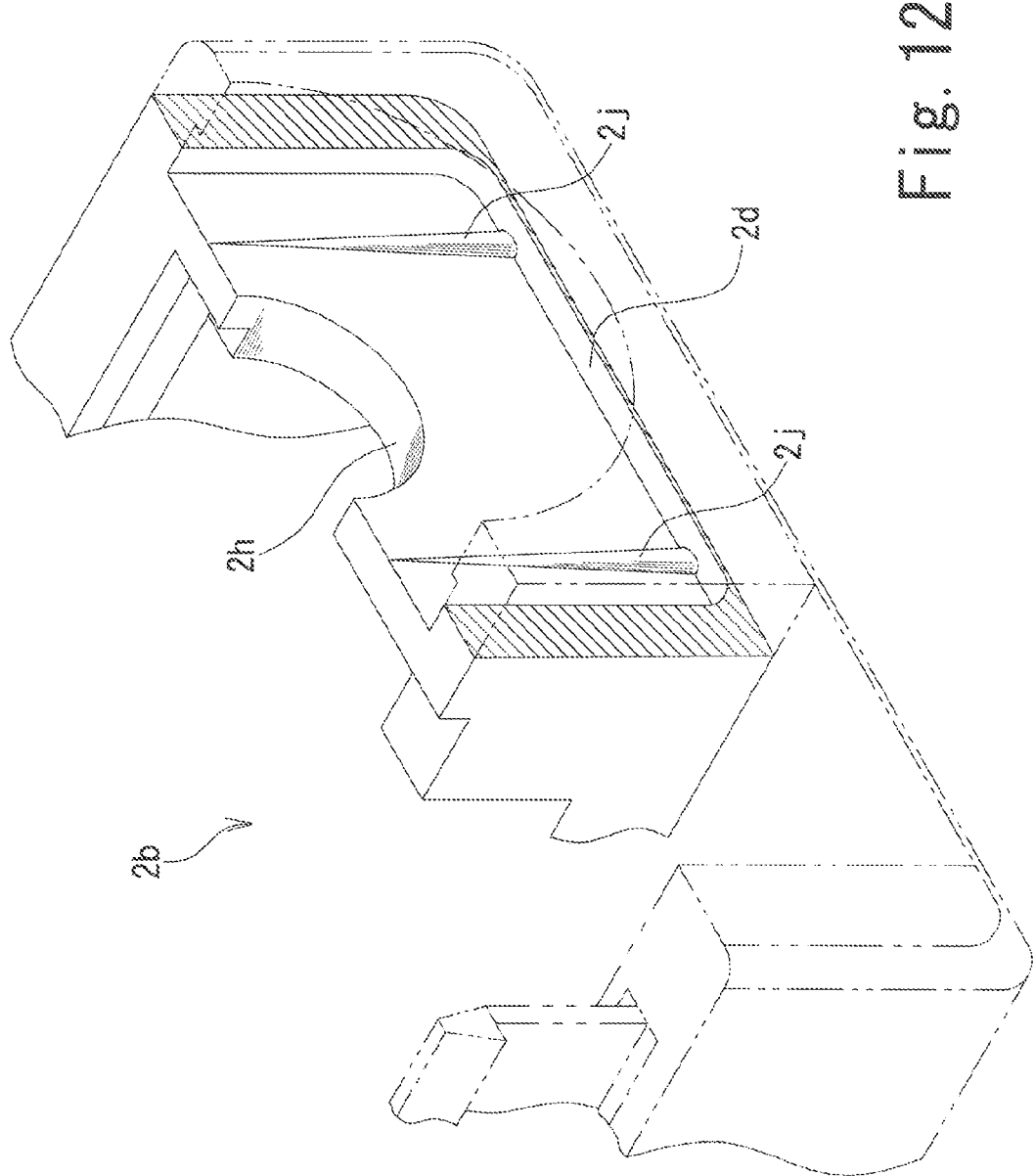
FIG. 12 is a perspective view illustrating, in an enlarged manner, projection portions of the case member illustrated in FIG. 11 and a periphery thereof.

FIG. 12 is a perspective view illustrating, in an enlarged manner, the projection portions 2j of the case member 2b illustrated in FIG. 11 and a periphery thereof. Note that, FIG. 12 emphatically illustrates the shapes of the projection portions 2j under a state in which the groove 2d is cut in the width direction of the case member 2b along the line XII-XII of FIG. 11.

In the groove 2d of the case member 2b, on one side surface in which the opening 2h is formed, the projection portions 2j are formed on both the sides of the opening 2h. Each of the projection portions 2j includes, similarly to the projection portion 2i illustrated in FIG. 10, an inclination which rises in the insertion direction of the flanges 8a and 10a. Therefore, the projection portion 2j has substantiality a cone shape, which widens toward the bottom surface of the groove 2d. Further, it is preferred that the maximum height (protruding dimension) of the inclined portion of the projection portion 2j with respect to the wall surface of the groove 2d be, similarly to the projection portion 2i, for example, about 0.1 mm.

Figure 13:
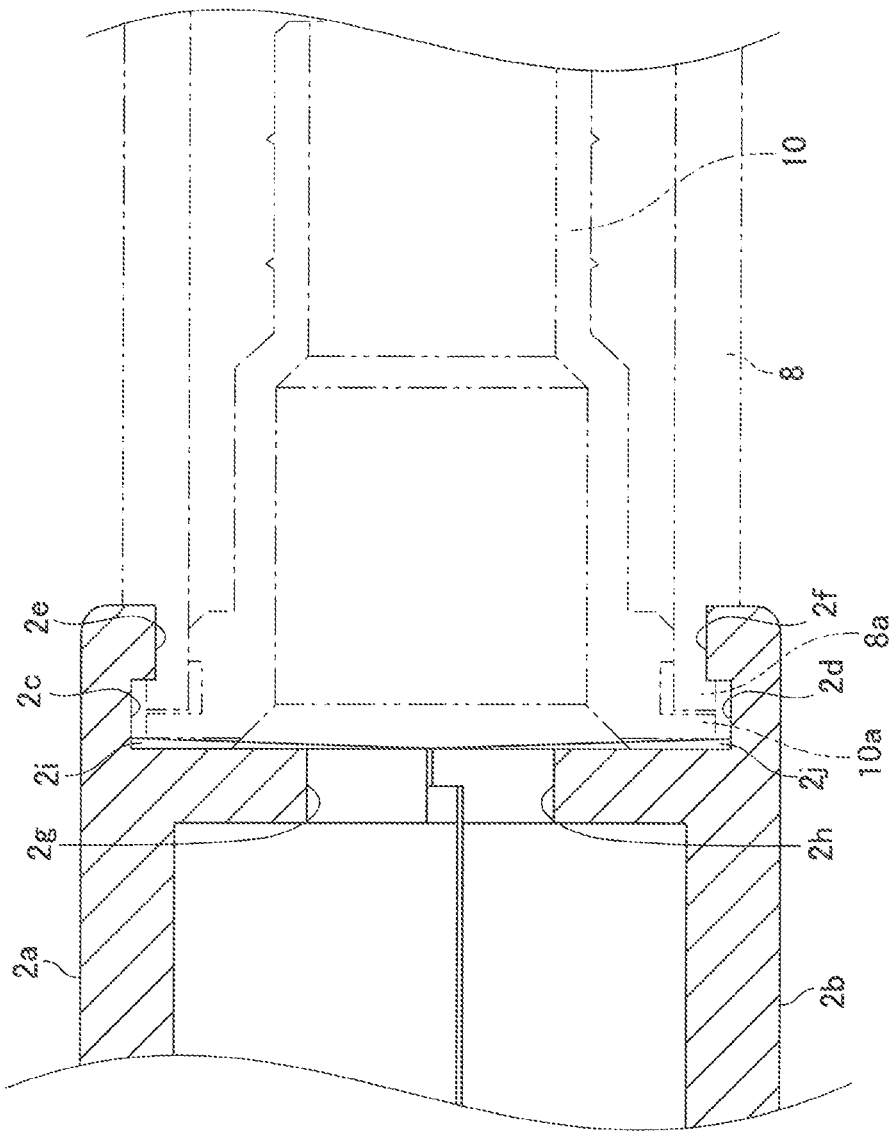
FIG. 13 is a cross-sectional view illustrating, in an enlarged manner, a fitting portion of flanges according to the second embodiment.

FIG. 13 is a cross-sectional view illustrating, in an enlarged manner, a fitting portion of the flanges 8a and 10a according to the second embodiment. FIG. 13 mainly illustrates, in an enlarged manner, a portion in which the flanges 8a and 10a of the boot 8 and the stop ring 10 are inserted in the grooves 2c and 2d of the case members 2a and 2b.

The width dimension (reference symbol is omitted) of the grooves 2c and 2d is set to be equal to the thickness dimension of the flanges 8a and 10a in the overlapped state, or to be slightly larger than the thickness dimension of the flanges 8a and 10*a* (for example, by about a dimension smaller than the protruding dimension of the projection portion, that is, 0.1 mm).

Generally, in a manufacturing process of the cable with a connector 1, after the flanges 8*a* and 10*a* of the boot 8 and the stop ring 10 are inserted in the groove 2*d* of one case member (for example, the case member 2*b*) serving as a base, a work of combining the other case member (for example, the case member 2*a*) is performed.

In such an assembly work, when the flanges 8*a* and 10*a* are inserted into the groove 2*d* of the case member 2*b* in an overlapped state, the flange 10*a* made of a metal moves toward the bottom surface of the groove 2*d* while sliding along the inclinations of the projection portions 2*j*. Meanwhile, the flange 8*a* made of a resin moves toward the bottom surface while being slightly deformed when the flange 8*a* is brought into contact with the wall surface of the groove 2*d*, and finally, the flanges 8*a* and 10*a* are inserted into the groove 2*d*.

Next, when the other case member 2*a* is caused to cover the one case member 2*b,* similarly to the above, the flange 10*a* fixed to the case member 2*b* moves toward the bottom surface (top surface in some cases) while sliding along the inclinations of the projection portions 2*i* of the groove 2*c*. Further, similarly, the flange 8*a* made of a resin also moves toward the bottom surface (top surface in some cases) while being brought into contact with the wall surface of the groove 2*c*.

As described above, in the second embodiment, by providing the inclined projection portions 2*i* and 2*j* on the wall surfaces of the grooves 2*c* and 2*d*, respectively, with which the flange 10*a* made of a metal is brought into contact, the flanges 8*a* and 10*a* may be smoothly inserted into the grooves 2*c* and 2*d*. Therefore, the cable with a connector 1 may be efficiently assembled.

Further, in the second embodiment, the width dimension of the grooves 2*c* and 2*d* may be set to be slightly larger than the thickness dimension of the flanges 8*a* and 10*a* in an overlapped state (specifically, by about a dimension smaller than the maximum protruding dimension of the projection portions 2*i* and 2*j*). Therefore, the work of inserting the flanges 8*a* and 10*a* into the groove 2*d* of the case member 2*b* and the groove 2*c* of the case member 2*a* can be easily performed.

Further, the width dimension between the wall surface and the projection portion 2*i* or 2*j* is narrowed by the maximum height (protruding dimension) of the inclination of the projection portion 2*i* or 2*j*, but similarly to the first embodiment, the flange 8*a* made of a resin is inserted while being deformed, and hence the flanges 8*a* and 10*a* may be inserted into the grooves 2*c* and 2*d* without a gap. At this time, the flanges 8*a* and 10*a* are housed in the grooves 2*c* and 2*d* without a backlash. Therefore, the cable 6 may be fixed to the connector in a stable state.

[Third Embodiment]

Figure 14:
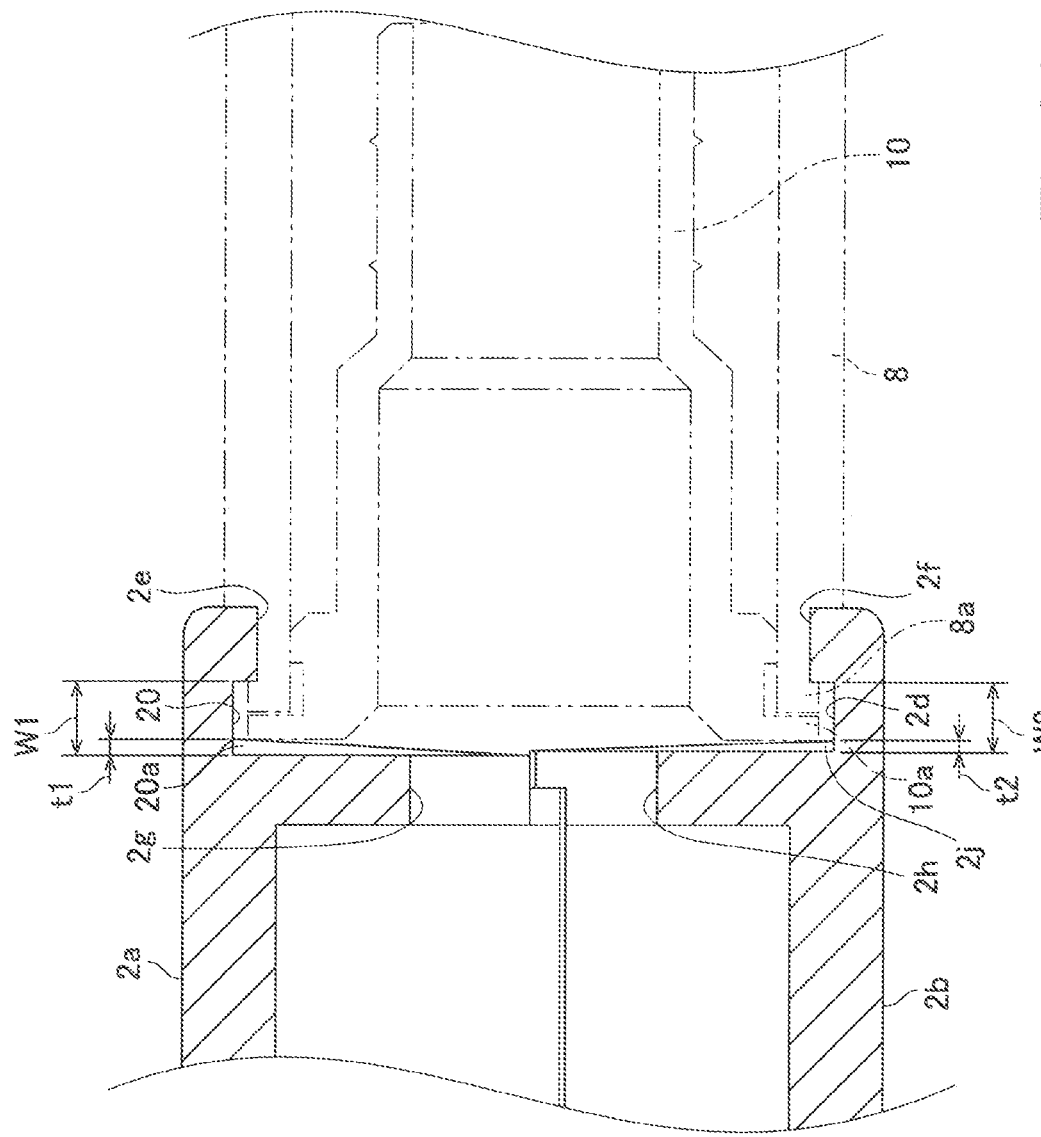
FIG. 14 is a cross-sectional view illustrating, in an enlarged manner, a fitting portion of flanges according to a third embodiment of the present invention.

Next, a cable with a connector 1 according to a third embodiment of the present invention is described. FIG. 14 is a cross-sectional view illustrating, in an enlarged manner, a fitting portion of the flanges 8*a* and 10*a* according to the third embodiment. In the third embodiment, a width dimension (reference symbol W1 in FIG. 14) of a groove 20 of the case member 2*a* is larger than the thickness dimension of the flanges 8*a* and 10*a* by about 0.1 mm. Further, the maximum height (protruding dimension t1) of a projection portion 20*a* formed on the wall surface of the groove 20 is set to be about 0.2 mm. Note that, the shapes of the groove 2*d* and the projection portion 2*j* of the case member 2*b* are similar to those of the second embodiment. Further, the width dimension (reference symbol W2 in FIG. 14) of the groove 2*d* is set equal to or slightly larger than the thickness dimension of the flanges 8*a* and 10*a*.

The projection portion 20*a* formed in the groove 20 has an inclination angle with respect to the wall surface larger than that of the projection portion 2*j* of the case member 2*b,* and accordingly the maximum height (protruding dimension t1) thereof is set larger than the maximum height (protruding dimension t2) of the projection portion 2*j*. With this, in the assembly process of the cable with a connector 1, the work of inserting the flanges 8*a* and 10*a* into the groove 2*d* of the case member 2*b* is relatively facilitated (resistance during press-fitting is small). Meanwhile, when the case member 2*a* is caused to cover the case member 2*b* after that, because the inclination angle of the projection portion 20*a* is increased, the flange 10*a* is inserted into the groove 20 in a stronger press-fitted state. Even in this case, the width dimension W1 of the groove 20 is larger than the thickness of the flanges 8*a* and 10*a*, and hence the flange 8*a* made of a resin is inserted into the groove 20 while not being extremely scraped on the wall surface thereof.

As described above, in the third embodiment, the width of the groove 20 is increased to further facilitate the insertion of the flanges 8*a* and 10*a* with respect to the case members 2*a* and 2*b*. Further, the projection portion 20*a* is formed considering the amount of width increase of the groove 20. In this manner, the flanges 8*a* and 10*a* may be inserted into the groove 20 without a gap.

[Fourth Embodiment]

Figure 15:
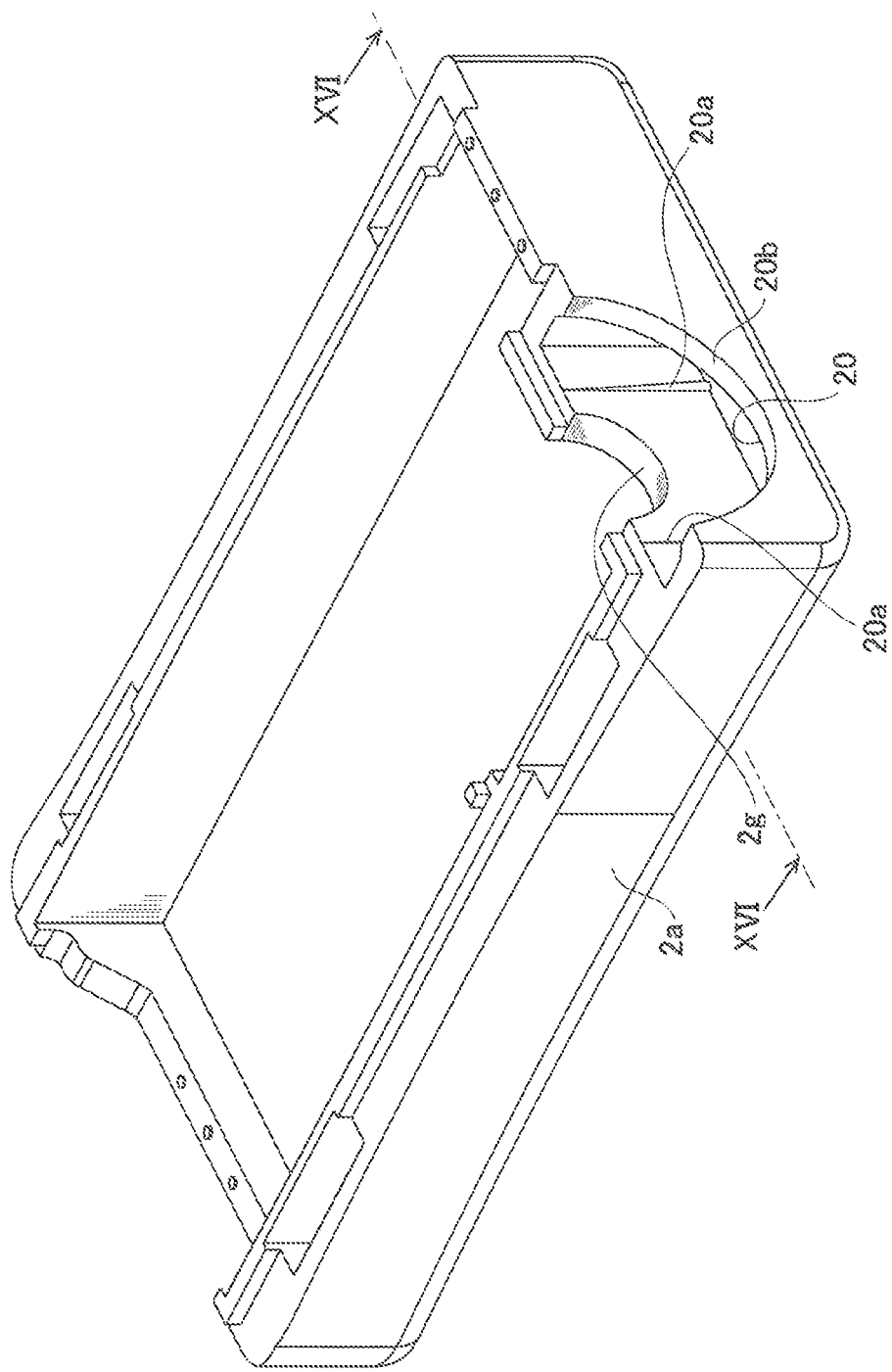
FIG. 15 is a perspective view schematically illustrating an outer appearance of a case member according to a fourth embodiment of the present invention.

Next, a cable with a connector 1 according to a fourth embodiment of the present invention is described. FIG. 15 is a perspective view schematically illustrating an outer appearance of the case member 2*a* according to the fourth embodiment. Note that, description is made with reference to FIG. 15 using the case member 2*a* described in the third embodiment as an example. Further, as for the case member 2*b* as a base in the assembly process, the same form as that in the first to third embodiments is used, and hence the description thereof is omitted here.

In the case member 2*a*, on one wall surface (one side end side of the case member 2*a*) in the groove 20, a substantially semicircular opening 20*b* is formed. Further, in a part of the peripheral edge of the opening 20*b*, an inclined surface (structure as a chamfer portion) is formed.

Figure 16:
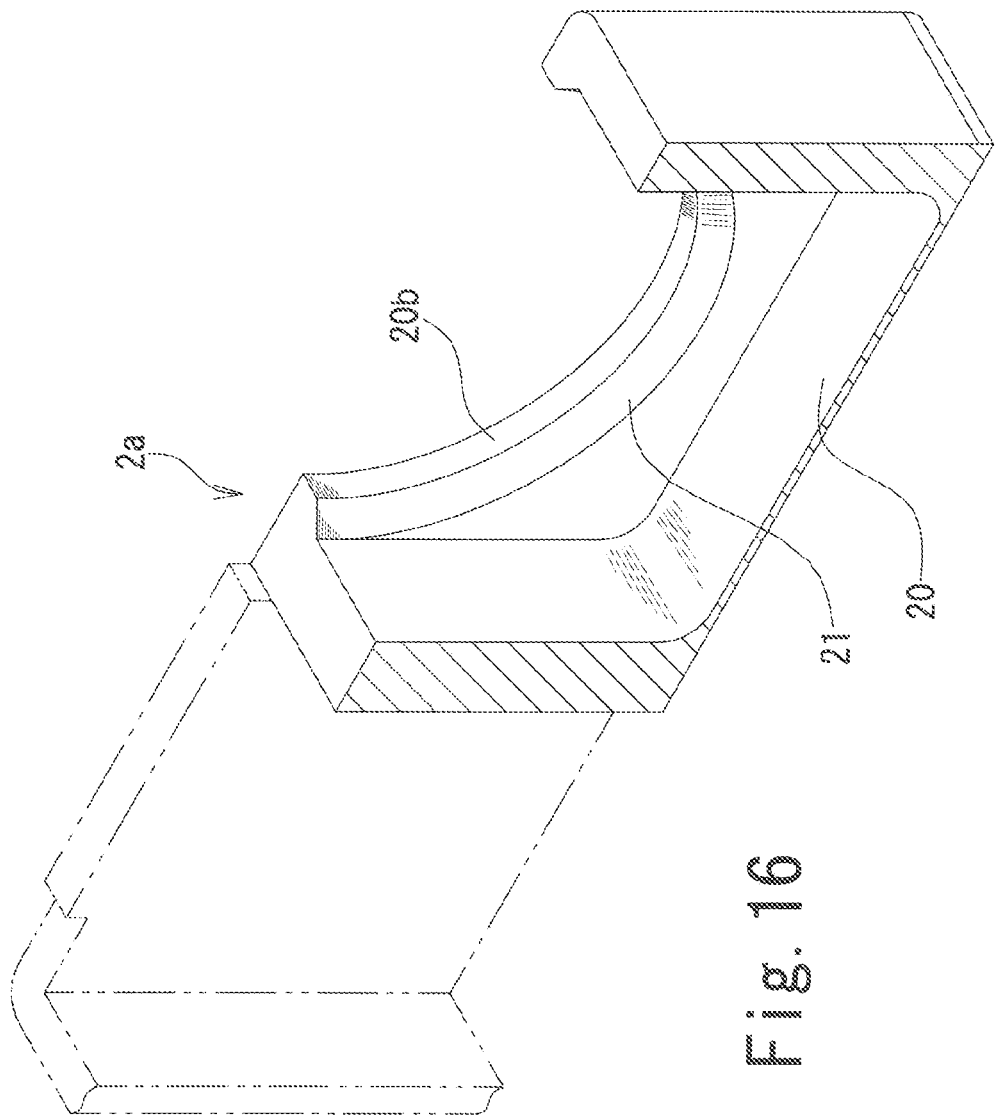
FIG. 16 is a perspective view illustrating, in an enlarged manner, an opening of the case member illustrated in FIG. 15 and a periphery thereof.

FIG. 16 is a perspective view illustrating, in an enlarged manner, the opening 20*b* of the case member 2*a* illustrated in FIG. 15 and a periphery thereof. Note that, FIG. 16 illustrates the case member 2*a* cut along the line XVI-XVI of FIG. 15, and further schematically illustrates the opening 20*b* when viewed from the opening 2*g* side of the case member 2*a*.

The opening 20*b* of the case member 2*a* includes an inclined surface 21 formed by obliquely chamfering a region of from the wall surface of the groove 20 toward the peripheral edge of the opening 20*b* continuous with the wall surface of the groove 20. The inclined surface 21 is inclined, for example, at 45 degrees with respect to the wall surface of the groove 20.

Figure 17:
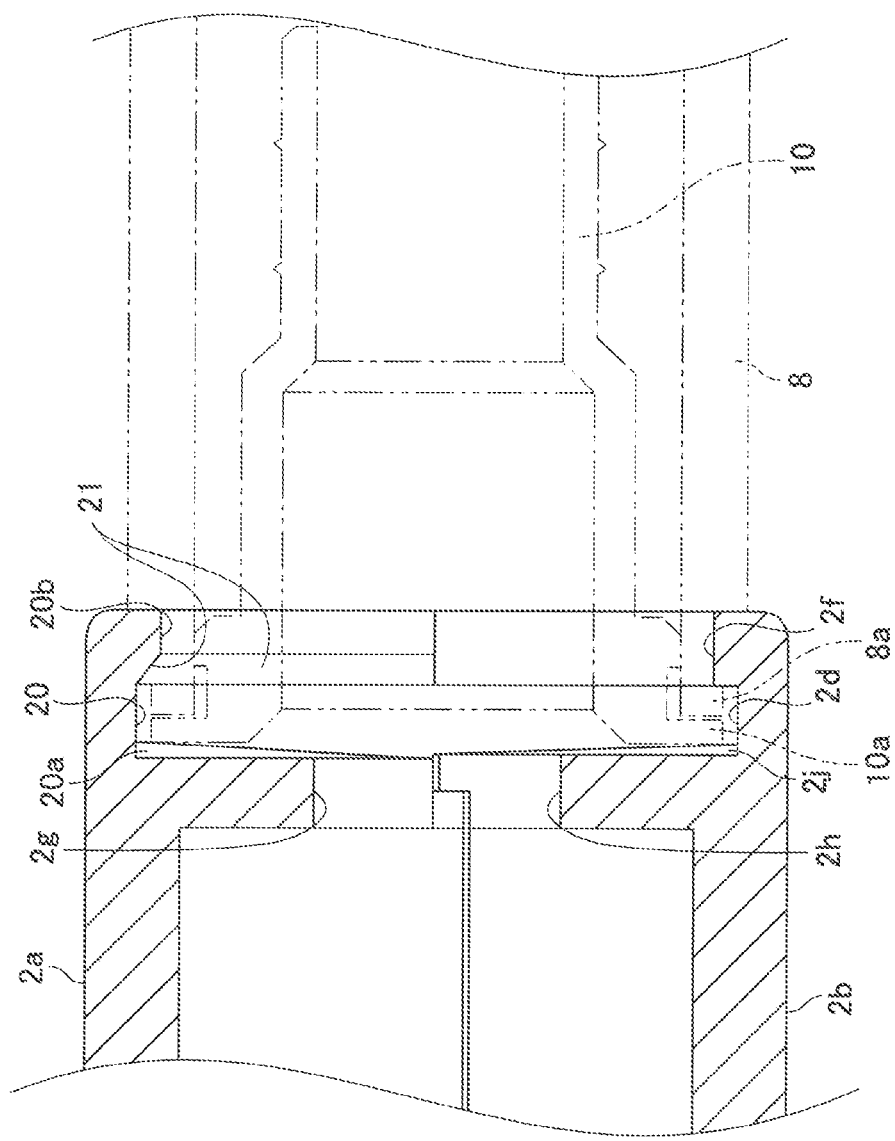
FIG. 17 is a cross-sectional view illustrating, in an enlarged manner, a fitting portion of flanges according to the fourth embodiment.

FIG. 17 is a cross-sectional view illustrating, in an enlarged manner, a fitting portion of the flanges 8*a* and 10*a* according to the fourth embodiment.

The inclined surface 21 formed in the opening 20*b* is inclined, for example, at 45 degrees with respect to the wall surface of the groove 20, and the width when the flanges 8*a* and 10*a* are inserted into the groove 20 is larger than the thickness of the flanges 8*a* and 10*a*. Therefore, the flange 10*a* may smoothly enter inside the groove 20 along the inclined surface 21 without being caught on the peripheral edge of the opening 20b.

Meanwhile, as illustrated in FIG. 17, similarly to the third embodiment, the width dimension (reference symbol is omitted) of the grooves 20 and 2d is slightly larger than the thickness dimension of the flanges 8a and 10a. Therefore, at the start of the insertion, the flanges 8a and 10a enter the groove 20 without being extremely pressed against the wall surface of the groove 20. Further, on the bottom surface side of the groove 20, the flange 10a slides along the inclinations of the projection portions 20a, and at the same time, the flange 8a is inserted into the groove 20 toward the bottom surface thereof under a state in which the flange 8a is pressed against the wall surface of the groove 20.

As described above, in the fourth embodiment, by forming the inclined surface 21 in the opening 20b of the case member 2a in the peripheral edge thereof, the flanges 8a and 10a may be further easily inserted into the groove 20 of the case member 2a.

The cable with a connector is not limited to ones described in the above-mentioned first to fourth embodiments, and various modifications are possible. For example, also in the first to third embodiments, the inclined surface 21 may be formed in the opening of the case member 2a in the peripheral edge thereof.

Further, in the first to fourth embodiments, the method of fixing the cable to the housing is described using the cable with a connector 1 adapted to transmit the optical signal and the electrical signal in a composite manner, but a similar method may be applied to, for example, a cable with a connector adapted to transmit only the optical signal, and a cable with a connector adapted to transmit only the electrical signal.

What is claimed is:

1. A cable with a connector, comprising:
   a cable, which comprises a transmission line covered with a jacket;
   a connector, which is fitted to a terminal portion of the cable;
   a holding member made of a metal, which comprises:
      a main body formed into a cylinder shape, through which the transmission line drawn out from the jacket at the terminal portion of the cable is inserted on an inner side of the main body, the main body holding the transmission line under a state in which an outer surface of the main body is covered with the jacket; and
      a first flange, which is formed at one end of the main body located on a terminal side of the cable;
   an exterior member made of a resin, which covers an outer periphery of the terminal portion of the cable together with the holding member, and comprises a second flange which is formed at one end of the exterior member located on the terminal side of the cable, the second flange being overlapped with the first flange; and
   two case members, which are combined so that the transmission line drawn out from the jacket at the terminal portion of the cable is housed inside thereof, the two case members in the combined state holding the first flange and the second flange so that the first flange and the second flange are brought into press-contact to each other in an overlapping direction.

2. A cable with a connector according to claim 1, wherein each of the two case members comprises a groove, in which the first flange and the second flange are insertable in a combining direction of each groove, the groove being formed between a pair of wall surfaces opposed in the overlapping direction of the first flange and the second flange.

3. A cable with a connector according to claim 2, wherein the each of the two case members further comprises a projection portion, which is formed so as to be protruded in the groove from one of the pair of wall surfaces, and is provided with an inclination which rises when viewed from an insertion direction of the first flange and the second flange into the groove.

4. A cable with a connector according to claim 3, wherein one of the two case members has a maximum protruding dimension of the projection portion in the groove, the maximum protruding dimension being larger, when viewed from the overlapping direction of the first flange and the second flange, than a maximum protruding dimension of the projection portion formed in the groove of another of the two case members.

5. A cable with a connector according to claim 3, wherein in each of the two case members, the projection portion is formed on one of the pair of wall surfaces with which the first flange is brought into contact when the first flange and the second flange are inserted in the groove.

6. A cable with a connector according to claim 3, wherein at least one of the two case members comprises a chamfer portion, which is formed along an opening edge of the groove located on a combining surface of the each of the two case members, and partially widens an interval between one of the pair of wall surfaces on which the projection portion is formed and another of the pair of wall surfaces opposed thereto.

7. A cable with a connector according to claim 2, wherein:
   one of the two case members has a width dimension of the groove between the pair of wall surfaces, the width dimension being larger than a thickness dimension of the first flange and the second flange in an overlapped state; and
   another of the two case members has a width dimension of the groove between the pair of wall surfaces, the width dimension being equal to or larger than the thickness dimension of the first flange and the second flange in the overlapped state.

8. A cable with a connector according to claim 1, wherein the holding member further comprises a crimp member, which tightens a periphery of the outer surface under the state in which the outer surface is covered with the jacket.

9. A cable with a connector according to claim 1, wherein:
   the cable is adapted to transmit an optical signal and an electrical signal by using an optical fiber and an electrical wire as the transmission line; and
   the connector comprises a photoelectric conversion module for mutual conversion between the optical signal and the electrical signal.

\* \* \* \* \*